April 28, 1931.   F. E. McMULLEN ET AL   1,802,388
FIXTURE FOR TESTING OR LAPPING GEARS
Filed July 29, 1929   2 Sheets-Sheet 1
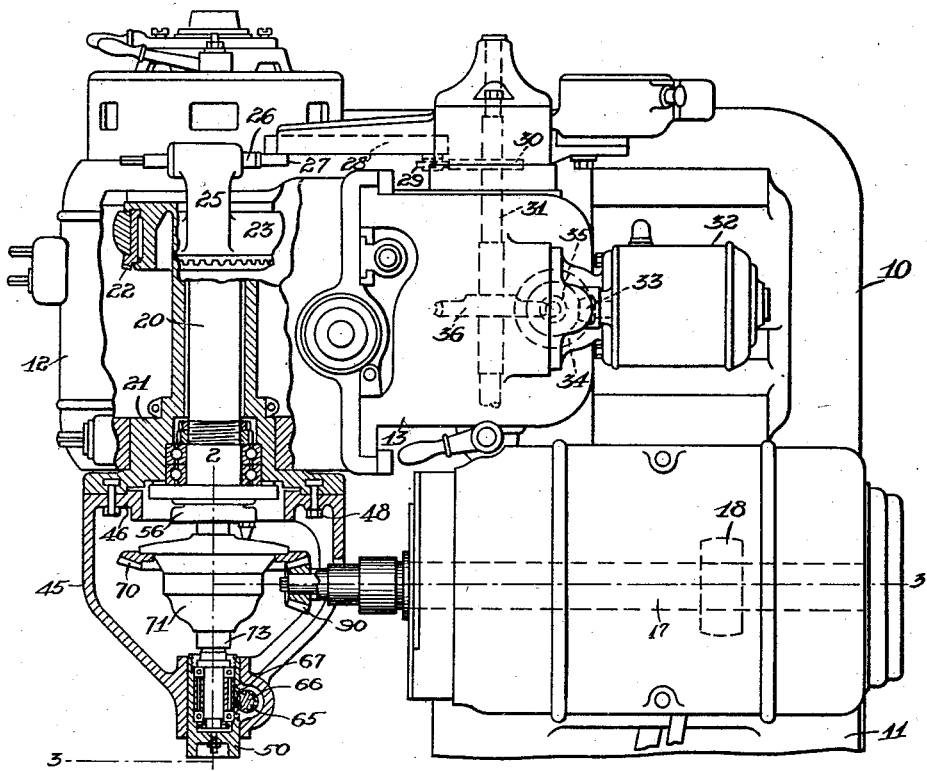
Fig.1
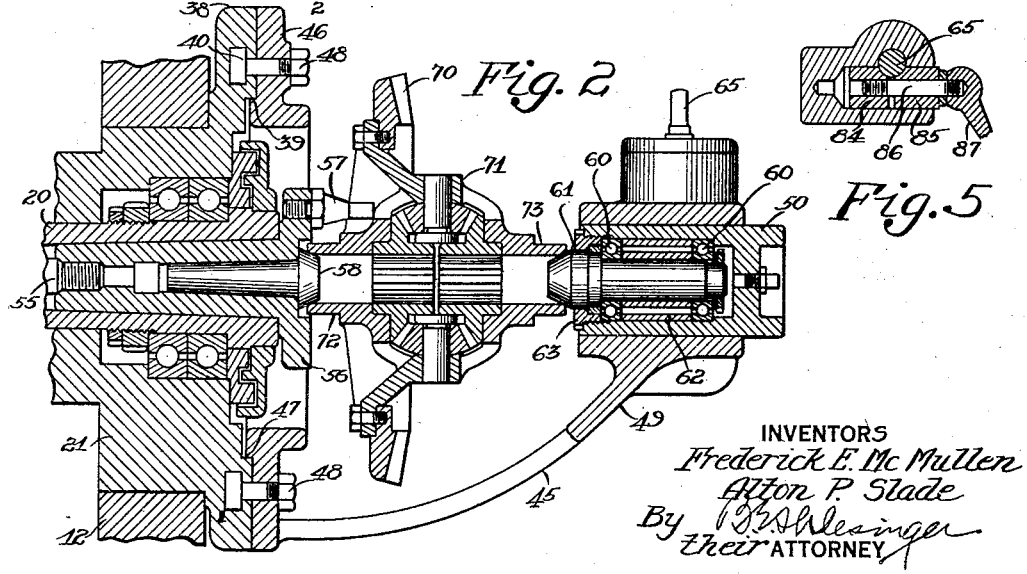
Fig.2
Fig.5
INVENTORS
Frederick E. McMullen
Alton P. Slade
By Schlesinger
their ATTORNEY INVENTORS
Frederick E. McMullen
Alton P. Slade
By their ATTORNEY Patented Apr. 28, 1931

1,802,388

UNITED STATES PATENT OFFICE

FREDERICK E. McMULLEN AND ALTON P. SLADE, OF ROCHESTER, NEW YORK, ASSIGNORS TO GLEASON WORKS, OF ROCHESTER, NEW YORK, A CORPORATION OF NEW YORK

FIXTURE FOR TESTING OR LAPPING GEARS

Application filed July 29, 1929. Serial No. 381,985.

The present invention has reference to the testing and lapping of gears and particularly to the testing and lapping of gears which mesh with angularly disposed axes, such as bevel and hypoid gears.

The primary purpose of this invention is to permit the testing or lapping of the rear axle drive gears of automotive vehicles after the ring gear has been mounted upon the differential casing and to this end, the invention has for its purpose to provide a simple and inexpensive fixture for mounting the differential casing with the ring gear secured thereto on a testing or lapping machine of standard construction to permit testing the gear in mesh with its mate drive pinion or lapping the gear according to any usual or suitable process. One of the features of the present invention is the means for centering the differential casing on the testing or lapping machine so that the casing will run absolutely true.

The present practice is to test or lap rear axle drive gears after they have been cut and before the ring gear has been assembled upon the differential casing. Many rear axle drives are bought, however, as assembled units with the driven gear mounted on the differential housing and the gears of the differential assembled therein. In such cases, the axle manufacturer may frequently find it desirable to test the drive before assembling the unit into the axle. Any inaccuracy in the mounting of a gear might affect the drive. Moreover, as a final finishing operation, there are many instances, also, where it might prove desirable to lap the ring gear after it has been secured in place on the differential housing. The present invention provides a fixture whereby the final test or final finishing operation may be accomplished readily and expeditiously on a standard testing or lapping machine.

The principal objects of the present invention have already been referred to. Other objects will be apparent hereinafter from the specification and from the recital of the appended claims.

In the drawings:

Figure 1 is a fragmentary plan view with parts shown in section, showing the use of the fixture of the present invention on a testing or lapping machine of the construction described in the copending application of Alton P. Slade, one of the present co-inventors, Serial No. 296,562, filed July 31, 1928;

Figure 2 is a section on an enlarged scale taken on the line 2—2 of Figure 1;

Figure 5 is a section on the line 5—5 of Figure 4.

Figure 3:
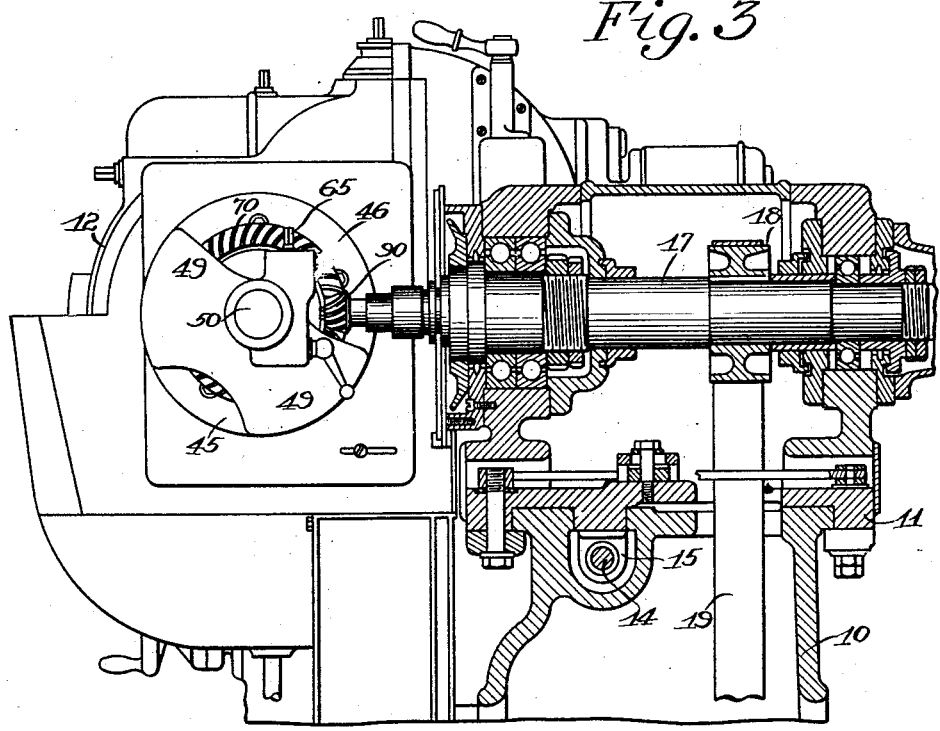
Figure 3 is a fragmentary sectional view taken on the line 3—3 of Figure 1.
Figure 4:
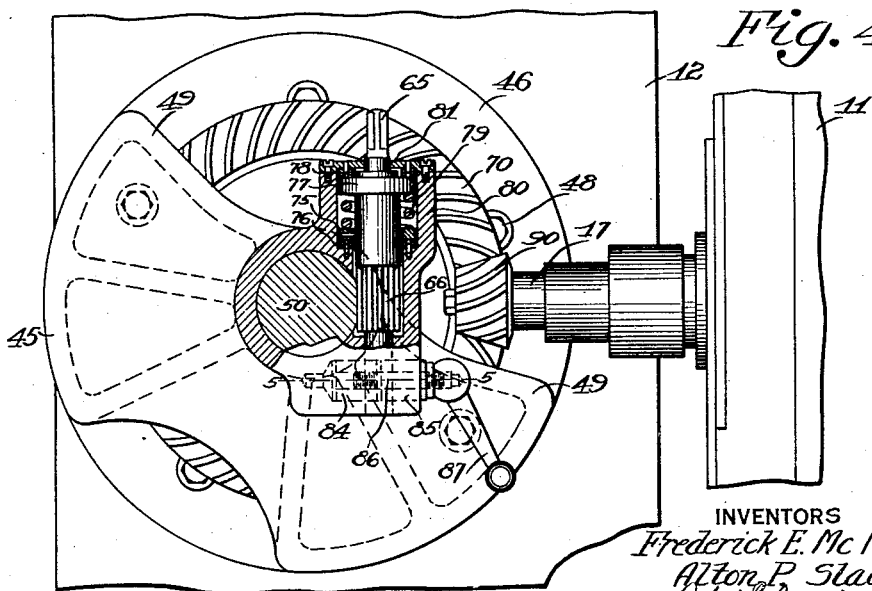
Figure 4 is a view on an enlarged scale, partially in section, of parts shown in Figure 3.

The invention will be described in connection with a particular embodiment as designed for use on the lapping and testing machine of the Slade application above referred to. It will be understood, however, that it is capable of modification and is not restricted to use with this type machine but may be employed in connection with various types of testing and lapping machines as will be understood by those skilled in the art.

10 designates the frame of a machine constructed according to the application. This machine is provided with a drive head 11 and with a driven head 12. The drive head 11 is slidable on the frame 10 while the driven head 12 is mounted for vertical adjustment on a column or upright 13 which, in turn, is adjustable on the frame in a direction at right angles to the direction of adjustment of the drive head 11. The adjustment of the drive head 11 may be effected by means of the screw 14 which is connected to the frame and threads into a nut 15 that is secured to the drive head. The means for making this adjustment and for adjusting the driven head 12 and column 13 and for clamping these parts in any adjusted position form no part of the present invention and for a more particular description thereof reference may be had to the application mentioned.

The drive head 11 serves as a support for the drive spindle 17 which is suitably journaled therein and which is driven by the pulley 18 and belt 19 from a motor housed in the frame or from any other suitable source of power.

The driven spindle 20 of the machine is disposed at right angles to the drive spindle 17 and is journaled in a carrier 21 with its axis parallel to but eccentric of the axis of the carrier. The carrier 21 is suitably journaled in the driven head 12 and is adjustably connected by means of a bevel gear 22 with a yoke-member 23. The yoke-member 23 has formed integral with it an arm 25 which carries a follower 26 that engages a roller 27 which is secured to one end of a slide 28. The other end of this slide 28 carries a roller 29 that engages the periphery of a cam 30 which is secured to a cam shaft 31 that is journaled in the upright or column 13 of the machine. The cam shaft 31 is driven from the motor 32 through the bevel gears 33 and 34, the worm 35 and the worm wheel 36.

The mounting of the drive and driven spindles and the means for actuating the same and the means for actuating the eccentric carrier form no part of the present invention. For a more particular description thereof, reference may be had to the application above mentioned. Suffice it to say that when the follower 26 is engaged with the roller 27 and the cam shaft 31 is operated, an oscillatory movement will be imparted to the carrier 21 to oscillate the driven spindle 20. In one respect, however, a change is made in construction from that shown in the application mentioned and that is in regard to the eccentric carrier. For the purposes of the present invention this carrier preferably has that portion of its peripheral surface designated at 38 turned so that it is eccentric of the axis of the driven spindle 20 and is provided with an annular guide surface 39 concentric of the axis of the driven spindle and also with an annular T-groove 40 concentric of this axis of the driven spindle. In its preferred construction, then, when employed for the purpose of the present invention, the carrier 21 will have a peripheral surface 38, an annular guide surface 39 and an annular groove 40 eccentric of its own axis.

The fixture comprising the improvement of the present invention includes a support, designated generally at 45. This support has an annular base 46 which is centered on the carrier 21 by the guide surface 47 that engages the guide surface 39 of the carrier internally thereof and which is adjustably secured to the carrier by means of T-bolts 48, the heads of which engage in the circular T-slot 40 formed in the carrier. Formed integral with the base 46 of the carrier 45 and projecting therefrom are a pair of arms 49 which are joined at their outer end to form a bearing or support for the slidable sleeve 50.

Secured in the driven spindle 20 (Fig. 2) as by means of a draw-bar 55 is an arbor 56 to which is secured a driving dog 57. The bore of the arbor 56 is tapered and serves as a support for a center 58, the axis of which coincides with the axis of the driven spindle 20.

Journaled on anti-friction bearings 60 in the sleeve 50 is a center 61. The arms 49 and sleeve 50 are so constructed that this center 61 is in axial alignment with the center 58.

The bearings 60 for the center 61 are spaced apart and held in spaced relation by the sleeve 62 and are secured in the slidable sleeve 50 by means of the nut 63.

The center 61 is adjustable toward and from the center 58 by rotation of the stud shaft 65 on which is formed a pinion 66 which meshes with a rack 67 that is cut into the sleeve 50.

To test or lap a rear axle drive gear, such as the spiral bevel ring gear 70, after it has been assembled on the differential housing 71, the center 61 is moved away by rotating the shaft 65 and the differential casing 71 with the ring gear 70 mounted thereon is swung into position between the two centers 58 and 61. The center 61 is then moved toward the center 58 by rotation of the shaft 65 to engage the center 58 in the sleeve portion 72 of the differential housing and the center 61 in the sleeve portion 73 of the housing, and engage the driving dog 57 with the differential housing, thus centering the differential casing and the ring gear 70 mounted thereon with reference to the axis of the driven spindle 20 of the machine, and connecting the housing to the spindle 20 to rotate therewith.

As the noses of the centers 58 and 61 are tapered, the weight of the differential housing and ring gear tends to move the centers apart. To avoid spreading of the centers until the means for locking the center 61 in forward position can be applied, means is provided for frictionally holding this center in any adjusted position. This means includes a ring 75 that is pinned to the shaft 65 but is slidable thereon, a friction disc 76 which is adapted to be engaged by this ring, a collar 77 which is formed integral with the shaft 65, a friction disc 78 which is adapted to engage one face of this collar and a spring 79 which surrounds the shaft 65 and is interposed betweeen the ring 75 and the collar 77. The friction disc 76 is secured within the recess in the extension 80 of the arms 49 in which the shaft 65 is mounted. The friction disc 78 is secured to the cap 81 for this recess which cap serves also as a bearing for the shaft 65. When the differential case is mounted between the centers 58 and 61, any tendency of the center 61 to move outwardly is resisted by the frictional engagement of the ring 75 and collar 77 with the friction discs 76 and 78, respectively.

To secure the center 61 positively in position during testing or lapping, the two blocks 84 and 85 are provided. These are slidable in a bore formed in the extension 80. Each block has a portion of one face curved on an arc to engage the periphery of the shaft 65. The two blocks are adjustable toward and from each other to clamp or release, respectively, the shaft 65 by means of the screw 86 which is manipulated by the handle 87.

In testing, the pinion 90 which is to mate with the ring gear 70 will be secured to the drive spindle 17 and the heads 11 and 12 adjusted to bring the pinion in mesh with the drive gear. When power is applied to the drive spindle 17, the two gears will rotate together and the test may be made according to the practise employed in the testing of any set of gears. During the test, the carrier 21 is stationary. The adjustment of the carrier 21 in the head 12 can be employed, however, to adjust the position of the axis of the ring gear 70 with reference to the axis of the drive pinion 90 to determine the best mounting position as will be clear to those skilled in the art.

In lapping, the motion of the carrier 21 will be employed to impart an oscillatory movement to the driven spindle 20 to move the drive gear in and out and up and down with reference to the pinion and simultaneously a lapping compound will be applied to the two gears. The lapping may be done with the mating pinion 90 or with a pinion cut especially for lapping.

By reason of the angular adjustment provided for the support 45, it is possible to employ the same fixture to test or lap both bevel and hypoid gears since the fixture can be adjusted on the carrier 21 so that the arms 49 clear the drive spindle 17 whether that spindle be in the same plane with or offset from the driven spindle and whether the motion of the carrier 21 be employed or not.

While it has not been so shown in the drawings, it will be understood that the testing or lapping may be effected, also, with the differential casing mounted in its own bearings.

While the present invention has been described in connection with a particular embodiment and in connection with a particular use for that embodiment, it will be understood that it is capable of various modifications and uses and that this application is intended to cover any variations, uses, or adaptations in the invention, following, in general, the principles of the invention and including such departures from the present disclosure as come within known or customary practise in the art to which the invention pertains and as may be applied to the essential features hereinbefore set forth and as fall within the scope of the invention or the limits of the appended claims.

Having thus described our invention, what we claim is:

1. In a machine of the class described, a pair of spaced centers adapted to carry rotatably between them a differential housing with a driven gear mounted thereon, a spindle adapted to carry a gear which is adapted to mesh with said driven gear, means for adjusting the gears into mesh, and means for rotating one of said gears.

2. An attachment for a machine of the class described which is provided with a pair of spindles and with means for rotating one of said spindles, said attachment comprising means for supporting a differential housing on spaced centers so that the axis of the driven gear which is secured externally of said housing is in alignment with the axis of one of said spindles, and means connecting said housing to said spindle to rotate bodily therewith, the other of said spindles being arranged to carry a gear to mesh with the driven gear, said spindles being adjustable relative to each other to permit meshing of said gears together.

3. In a machine of the class described, the combination with a frame, a carrier angularly movable in said frame, and a pair of angularly disposed spindles, one of which is mounted eccentrically in said carrier, of a center adapted to be mounted in the latter spindle, a support adapted to be secured to said carrier having an arm projecting therefrom, a center mounted on said arm in alignment with the first center, said two centers serving to support between them a differential casing with a gear mounted thereon, means secured to the spindle in which the first named center is mounted for connecting said gear and spindle to rotate together, the other spindle being arranged to carry a gear to mesh with the first named gear, means for adjusting the two gears into mesh and means for rotating one of said spindles.

4. In a machine of the class described, the combination with a frame, a carrier angularly movable in said frame, and a pair of angularly disposed spindles, one of which is mounted eccentrically in said carrier, said carrier being provided with an annular guide surface concentric of said spindle, of a center adapted to be mounted in said spindle, a support mounted on said carrier for angular adjustment relative thereto having a surface adapted to engage the guide surface of said carrier and having an arm extending in the general direction of the axis of the spindle, a center mounted in said arm in alignment with the first center, said two centers serving to support between them a differential casing with a gear mounted thereon, means secured to the spindle in which the first named center is mounted for connecting said gear and spindle to rotate together, the other spindle being arranged to carry a gear to mesh with the first named gear, means for adjusting the two gears into mesh, and means for rotating one of said spindles.

5. In a machine of the class described, the combination with a frame, a carrier angularly movable in said frame, and a pair of angularly disposed spindles, one of which is mounted eccentrically in said carrier, said carrier being provided with an annular guide surface concentric of said spindle, of a center adapted to be mounted in said spindle, a support mounted on said carrier for angular adjustment relative thereto having a surface adapted to engage the guide surface of said carrier and having an arm extending in the general direction of the axis of the spindle, a center mounted on anti-friction bearings in said arm in alignment with the first center and adjustable toward and from the first center, said two centers serving to support between them a differential casing with a gear mounted thereon, means secured to the spindle in which the first named center is mounted for connecting said gear and spindle to rotate together, the other spindle being arranged to carry a gear to mesh with the first named gear, means for adjusting the two gears into mesh, and means for rotating one of said spindles.

6. In a machine of the class described, the combination with a frame, a carrier angularly movable in said frame, and a pair of angularly disposed spindles, one of which is mounted eccentrically in said carrier, said carrier being provided with an annular guide surface concentric of said spindle, of a center adapted to be mounted in said spindle, a support mounted on said carrier for angular adjustment relative thereto having a surface adapted to engage the guide surface of said carrier and having an arm extending in the general direction of the axis of the spindle, a center mounted on anti-friction bearings in said arm in alignment with the first center and adjustable toward and from the first center, said two centers serving to support between them a differential casing with a gear mounted thereon, means operable to retain the last named center frictionally in any adjusted position, means for positively locking said center in any adjusted position, means secured to the spindle in which the first named center is mounted for connecting said gear and spindle to rotate together, the other spindle being arranged to carry a gear to mesh with the first named gear, means for adjusting the two gears into mesh and means for rotating one of said spindles.

7. In a machine of the class described, the combination with a frame, a carrier angularly movable in said frame, and a pair of angularly disposed spindles one of which is mounted in said carrier with its axis parallel to but offset from the axis of said carrier, of a center adapted to be mounted in said spindle, a support mounted on said carrier having an arm projecting therefrom, a center rotatably mounted in said arm in alignment with the first center, said two centers serving to support between them a differential casing with a gear mounted thereon, means for connecting the first named spindle and said gear to rotate together, the other spindle being arranged to carry a gear to mesh with the first named gear, means for adjusting the two gears into mesh, means for rotating one of said spindles, and means for simultaneously rotating said carrier.

8. An attachment for gear testing, burnishing and lapping machines for mounting thereon a differential case which has the rear axle drive gear already secured thereto, comprising a bracket, adapted to be secured to one head of the machine, having an arm extending therefrom, and a center rotatably mounted in said arm, said center being adapted to serve as an outboard support for the differential case and cooperate with means carried by a spindle of the machine to support said case so that it will rotate with said spindle.

9. In a machine of the class described, a frame, a pair of heads adjustable on the frame at an angle to one another, a spindle journaled in one head, means for detachably securing a gear to said spindle, a second spindle journaled in the other head, means secured to said second spindle adapted to engage and support one end of a differential housing on which the driven gear of a rear-axle drive has been secured, means for causing said housing to rotate with said spindle, a bracket secured to the head in which the last named spindle is journaled, said bracket having an arm extending therefrom around the differential housing, means secured in the outer end of said arm adapted to rotatably support the differential housing at its other end, and means for rotating one of said spindles to cause the two gears to rotate in mesh.

10. In a machine of the class described, a frame, a pair of heads adjustable on the frame at an angle to one another, a spindle journaled in one head, means for detachably securing a gear to said spindle, a spindle journaled in the other head, a center carried by said second spindle adapted to support one end of a differential housing on which the driven gear of a rear axle drive has been secured, a dog secured to the second spindle adapted to engage said housing to cause said housing to rotate with said second spindle, a bracket secured to the head in which the last named spindle is journaled, said bracket having an arm extending therefrom around the differential housing, a center journaled in the outer end of said arm adapted to engage and support the other end of the differential housing, means carried by said arm for adjusting said center toward and from the first named center, and means for rotating one of said spindles to cause the two gears to rotate in mesh.

11. In a machine of the class described, a frame, a pair of heads adjustable on the frame at an angle to one another, a spindle journaled in one head, means for detachably securing a gear to said spindle, a carrier rotatably mounted in the other head, a second spindle journaled in said carrier with its axis parallel to but offset from the axis of said carrier, means secured to the second spindle adapted to engage and support one end of a differential housing on which the driven gear of a rear-axle drive has been secured, means causing said housing and second spindle to rotate together, a bracket adjustable angularly on said carrier about the axis of the second spindle, said bracket having an arm extending therefrom around the differential housing, means secured in the outer end of said arm adapted to rotatably support the differential housing at its other end, and means for rotating one of said spindles to cause the two gears to rotate in mesh.

F. E. McMULLEN.
A. P. SLADE.